Dec. 31, 1968   J. H. LEPP ET AL   3,419,222
MATERIAL UNLOADER
Filed Oct. 7, 1966   Sheet 2 of 2

Inventors
Jacob H. Lepp
Roy Ayranto

Attorney 3,419,222
MATERIAL UNLOADER
Jacob H. Lepp and Roy Ayranto, Grimsby, Ontario, Canada, assignors to International Harvester Company, Chicago, Ill., a corporation of Delaware
Filed Oct. 7, 1966, Ser. No. 585,029
7 Claims. (Cl. 239—681)

ABSTRACT OF THE DISCLOSURE

A mobile tank type manure spreader including a rotatable beater for throwing material from the tank. The beater includes a pair of radially disposed axially extending carriers each mounting a plurality of radially extending fingers. The carriers are interconnected for radial movement in unison both outwardly and inwardly in response to centrifugal force.

---

The present invention relates to a material unloader.

The material unloader or implement of the kind to which the invention is related is also generally known as a manure spreader.

Such material unloader is of the type having a container in which the material to be unloaded is placed, and a beater extending substantially over the entire area of the container; upon rotation of the beater the material is picked up and thrown from the container and spread on the ground, eliminating complicated construction as heretofore utilized in which, for example, a conveyor was incorporated in the implement for carrying the material to the beater located at an end of the container.

A broad object of the invention is to provide a material unloader of the foregoing general character in which the beater has fingers extending generally radially outwardly which project to a progressively greater distance as the load of material is depleted so that the fingers engage and enter into the top surface of the material a substantially uniform extent throughout the unloading operation.

Another object is to provide a material unloader of the foregoing character in which the fingers of the beater are normally held in retracted position by yieldable means and thrown out by centrifugal force as the load is depleted.

Still another object is to provide a novel and detail construction in which the fingers are incorporated in a unitary assembly working together, and those fingers that are idle, as when not engaging the material, are limited in the amount that they are thrown outwardly by those that are engaging the material.

Other objects and advantages of the invention will appear from the following detail description taken in conjunction with the accompanying drawings in which:

FIGURE 4 is a sectional view taken at line 4—4 of FIGURE 1;

FIGURE 5 is a detail view of one form of finger used in the beater;

FIGURE 6 is a detail view of another form of finger; and

FIGURE 7 is a detail view of a third form of finger.

Figure 1:
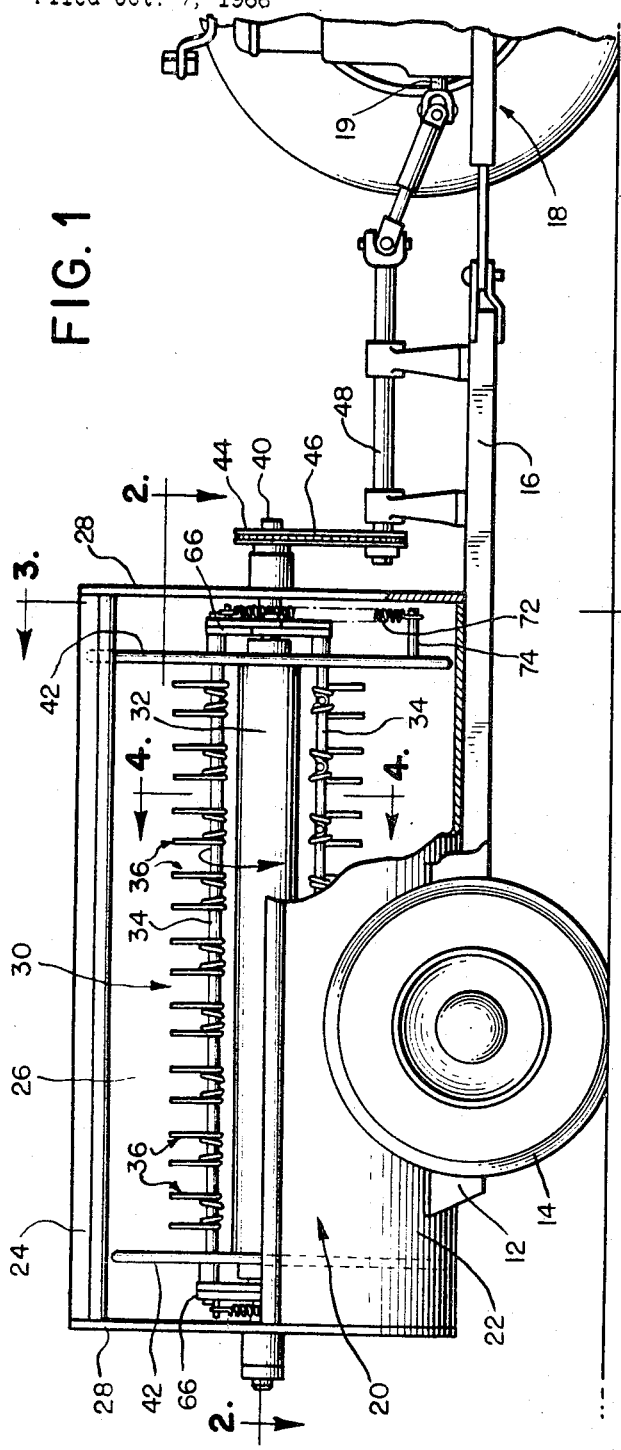
FIGURE 1 is a side view of a material unloader embodying the features of the present invention.
Figure 2:
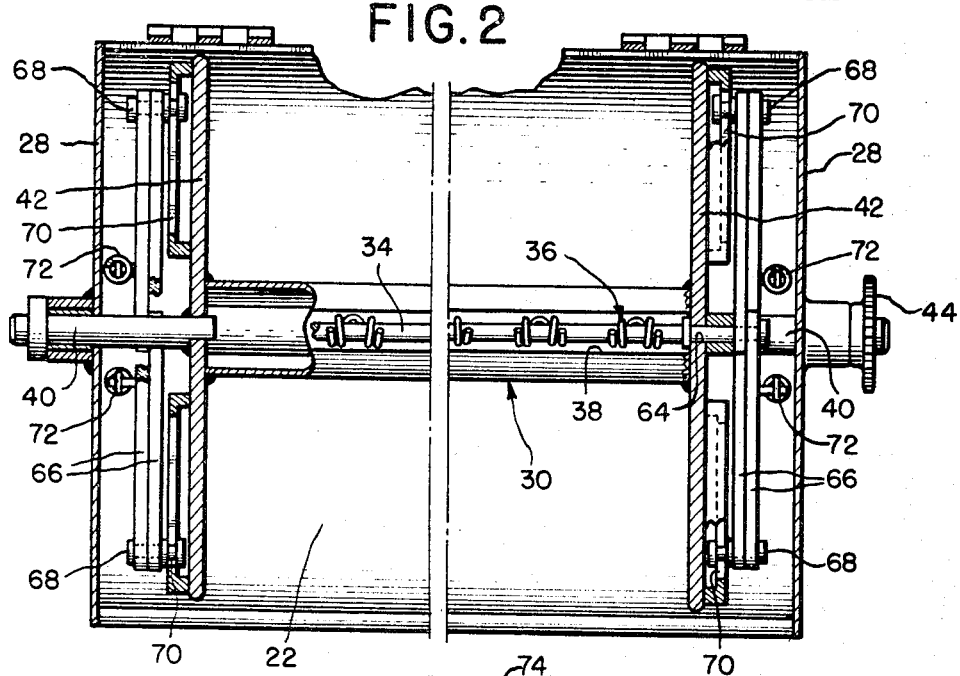
FIGURE 2 is a view taken at line 2—2 of FIGURE 3.

Referring now in detail to the accompanying drawings, attention is directed first to FIGURES 1 and 2 showing the material unloader or implement in its entirety. The implement includes a chassis 12 having wheels 14 and including a tongue 16 by which the implement is connected with a prime mover such as a tractor 18 having the usual power takeoff shaft 19.

The material unloader includes a container 20 which receives and contains the load of material to be unloaded and is of generally cylindrical form, having a bottom portion 22 and an upper extension 24 which forms a cover over the lower portion. The cover 24 however extends less than a semi-cylinder forming an opening 26 through which the material is thrown from the container and spread on the ground. End plates 28 are also preferably provided, closing the ends of the container. The container 20 may also be designated a box, and as the implement may be utilized for spreading liquid material, as it is, it also may be designated a tank.

Rotatably mounted in the container is a beater 30 including as its principal components a shaft 32, radially disposed axially extending rods 34 serving as carriers for fingers 36. Upon rotation of the beater the fingers enter or dig into the material in the container and throw it through the opening 26 as stated.

The shaft 32 (see FIGURE 3) may be of relatively large diameter and is provided with notches 38 for receiving the rods or carriers 34 when the latter are in contracted position. The shaft has end extensions 40 of suitable dimension journalled in bearings mounted in the end plates 28. The details of the construction of the shaft and its mountings need not be entered into. Preferably end plates 42 are incorporated in the beater, at the ends of the main shaft 32 serving as mounting means as described below.

Mounted on the front extension 40 of the shaft is a pulley 44 over which is trained a belt or chain 46 driven by a drive shaft 48 connected with the power takeoff 19 of the tractor.

One form of finger 36 is shown in FIGURE 5 which is of U-shape having a central coiled portion 50 encircling the rod or carrier 34 and held against rotational movement on the shaft by suitable means such as a rivet 52. The outer ends of the finger are free and detached, forming finger elements or prongs 54 which extend generally radially from the beater and constitute the elements which directly engage the material in the container. Another form of finger 56 is shown in FIGURE 6, having a piece 58 of substantial axial extent which may be in the form of an angle iron, secured to the extended ends of the finger elements and forming a scoop which may be used when unloading liquid materials. A third form of finger is shown in FIGURE 7 at 60, similar to the finger 36 of FIGURE 5 except that the finger elements may be flattened as indicated at 62 increasing their axial extent for providing greater area for engaging the material and throwing it.

Figure 3:
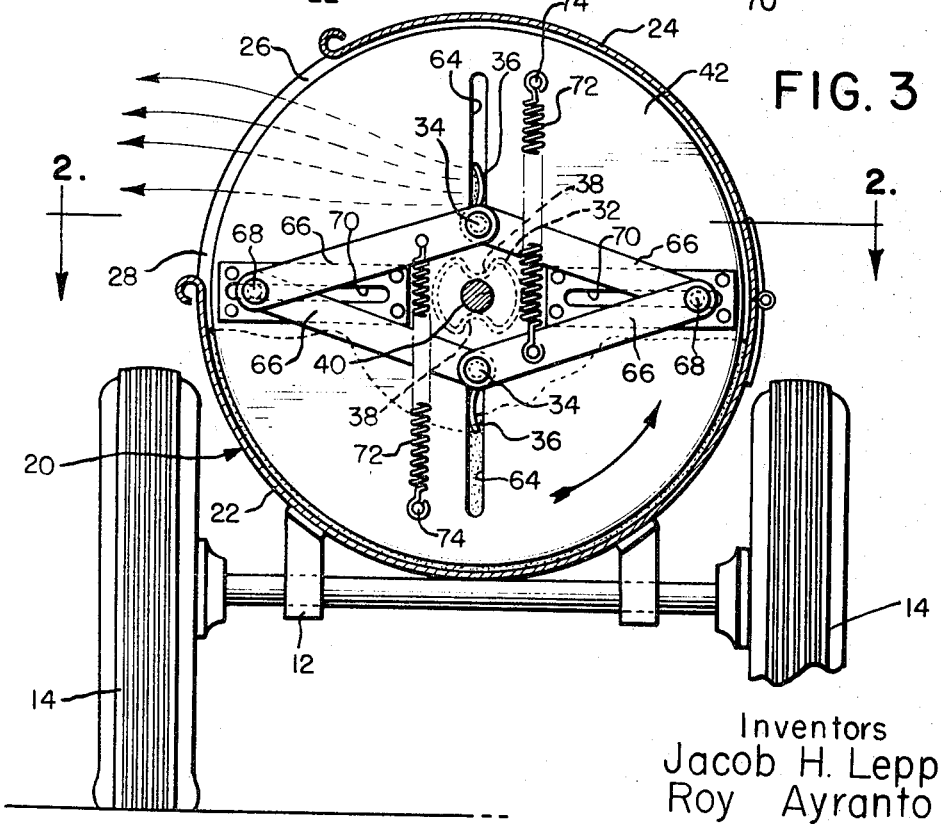
FIGURE 3 is a sectional view taken at line 3—3 of FIGURE 1.

The shaft 32, with its extensions 40, and the end plates 42 together form a rigid unit, while the rods or carriers 34 with the fingers thereon are mounted for movement radially of that unit. To this end the rods or carriers extend through radial slots 64 (FIGURE 3) in the end plates and are pivotally received in apertures in links 66 while the other ends of the links receive pins 68 in apertures therein, which ride in other radial slots 70 disposed in a line transverse to the first slots 64. Tension springs 72 are interconnected between the rods or carriers 34 and the end plates 42 by means of pins 74, biasing the rods 34 radially inwardly to their fully retracted position, in which they are disposed in the notches 38 (FIGURE 3).

The rods 34 are normally held in their fully retracted position shown in FIGURES 1 and 2 by the tension springs, and the lower portion 22 of the container 20 is relatively free and open for receiving a maximum load of material to be unloaded. Upon rotation of the beater the fingers 36 enter or dig into the material, but initially, when they are in fully retracted position, they dig into a minmum amount. Rotation of the beater tends to throw the rods or carriers with the fingers outwardly, but the fingers on the bottom are restrained by the material in the container, and as the load is depleted and the upper surface thereof lowers, the fingers fly out progressively further so that they dig into the material a substantially constant amount throughout the unloading operation. Finally when the material is substantially fully unloaded, the rods or carirers 34 reach their maximum outward position in which the fingers sweep over the cylindrical surface of the container, and if desired they may engage that surface, the flexibility of the fingers enabling the desired yielding in the latter case.

The assembly which includes the rods or carriers and the links 66 works as a unit, i.e., the two rods or carriers are thrown out or retracted a similar amount, because of the interconnection of the other ends of the links of the respective pairs through the pins 68. As the rods or carriers 34 ride in the slots 64, the pins 68 ride in the other slots 70 but in opposite radial directions, the pins 68 are moving radially inward while the rods 34 are moving radially outwardly. Both of the rods 34 must move together because of their interconnection through the links and therefore when those fingers on the lower side of the beater are engaging the material in the container they are constrained against radial outward movement by the material and those fingers that are then on the upper side of the beater are similarly constrained.

While the preferred construction provides for throwing the material laterally, it is possible to throw it in other directions, and even directly rearwardly.

While we have disclosed herein a certain preferred form of device it will be understood that changes may be made therein within the spirit and scope of the appended claims.

We claim:

1. A material unloader comprising a wheeled chassis, a container on the chassis, and a beater rotatably mounted in the container, the container having an opening directed laterally from the axis of rotation of the beater, the beater including carriers, and fingers on the carriers extending generally radially outwardly, the carriers being movable outwardly in response to centrifugal force, and means yieldingly biasing the carriers inwardly, and rigid means interconnecting the carriers for positively controlling the carriers for movement in unison both outwardly and inwardly.

2. A material unloader comprising a wheeled chassis, a container on the chassis, and a beater rotatably mounted in the container, the container having an opening directed laterally from the axis of rotation of the beater, the beater including carriers, and fingers on the carriers extending generally radially outwardly, the carriers being movable outwardly in response to centrifugal force, and means yieldingly biasing the carriers inwardly, and rigid means interconnecting the carriers for positively controlling the carriers for movement in unison both outwardly and inwardly, the beater including end plates, the carriers are in the form of axially disposed rods slidable in slots in the end plates, a pair of links are pivotally connected at one end with each of the carriers, and the outer ends of the links of respective ones of different pairs are pivotally connected together and ride in slots in the end plates whereby upon radial movement of the carriers, the other ends of the links move also in radial directions but in opposite radial directions from the carriers.

3. The invention according to claim 2 wherein the biasing means includes tension springs connected between the carriers and he end plates, and the points of connection on the end plates are adjacent the periphery thereof.

4. A material unloader comprising a wheeled chassis, a container on the chassis, and a beater rotatably mounted in the container, the container having an opening directed laterally from the axis of rotation of the beater, the beater including carriers, and fingers on the carriers extending generally radially outwardly, the carriers being movable outwardly in response to centrifugal force, and means yieldingly biasing the carriers inwardly, the beater includes a central shaft, and the carriers include axially extending rods, the shaft includes radially outwardly opening notches in registry with the rods, and the rods are capable of assuming a maximum inner position in which they are disposed in said slots.

5. A material unloader comprising a wheeled chassis, a container on the chassis, and a beater rotatably mounted in the container, the container having an opening directed laterally from the axis of rotation of the beater, the beater including carriers, and fingers on the carriers extending generally radially outwardly, the carriers being movable outwardly in response to centrifugal force, and means yieldingly biasing the carriers inwardly, the carriers include axially extending rods and the fingers include members mounted directly on the rods and having free ends extending radially outwardly therefrom, the free ends having limited flexibility.

6. A material unloader comprising a wheeled chassis, a container on the chassis, and a beater rotatably mounted in the container, the container having an opening directed laterally from the axis of rotation of the beater, the beater including carriers, and fingers on the carriers extending generally radially outwardly, the carriers being movable outwardly in response to centrifugal force, and means yieldingly biasing the carriers inwardly, the container is provided with end walls, the beater is journaled in the end walls and itself includes end plates spaced axially inwardly from the corresponding end walls, the carriers in the beater extend through the end plates, and the biasing means are mounted on the outer sides of the end plates between the end plates and the end walls.

7. A material unloader comprising a wheeled chassis, a container on the chassis, and a beater rotatably mounted in the container, the container having an opening directed laterally from the axis of rotation of the beater, the beater including carriers, and fingers on the carriers extending generally radially outwardly, the carriers being movable outwardly in response to centrifugal force, and means yieldingly biasing the carriers inwardly, the container includes a cylindrical wall member and end wall elements, the beater includes a main shaft with end shaft elements journaled in the end wall elements and end plates rigidly secured to the shaft and spaced axially inwardly from the end wall elements, the shaft has longitudinally extending, radially outwardly opening notches therein, the carriers include axially extending rods radially aligned with said notches, said fingers include U-shaped elements having central portions encircling the rods and free end finger elements extending generally radially outwardly, the rods extending through radial slots in the end plates, a pair of links are associated with each rod at each end of the beater each having one end pivotally secured to the end of the rod outwardly of the end plate, corresponding links of the different pairs having their other ends pivotally connected together and including pins at their other ends riding in radial slots in the end plates disposed perpendicular to the first slots, tension springs are provided on the outer ends of the end plates having one end connected with the rods and their other ends connected with the end plates adjacent the periphery of the end plates and arranged for biasing the bars radially inwardly, the shaft of the beater having one end extending through the end wall element of the container at the front end of the implement for connection with power driving means.

References Cited

UNITED STATES PATENTS

| | | | |
|---|---|---|---|
| 1,037,038 | 8/1912 | Mott | 239—682 |
| 1,170,673 | 2/1916 | Rice | 239—682 |
| 1,591,506 | 7/1926 | Blakeslee | 239—220 |
| 1,646,878 | 10/1927 | Schaefer | 239—684 |
| 3,165,322 | 1/1965 | Ferris | 239—658 |

FOREIGN PATENTS

| | | |
|---|---|---|
| 1,027,646 | 2/1953 | France. |
| 426,878 | 4/1935 | Great Britain. |

EVERETT W. KIRBY, *Primary Examiner.*

U.S. Cl. X.R.

239—689, 220